US006595596B1

United States Patent
Polka

(10) Patent No.: US 6,595,596 B1
(45) Date of Patent: Jul. 22, 2003

(54) METHOD AND APPARATUS FOR ATTACHING A COVER TO A WHEEL OF A TRUCK

(76) Inventor: John G. Polka, 1335 Margate, Libertyville, IL (US) 60048

( * ) Notice: Subject to any disclaimer, the term of this patent is extended or adjusted under 35 U.S.C. 154(b) by 0 days.

(21) Appl. No.: 10/127,955

(22) Filed: Apr. 23, 2002

(51) Int. Cl.[7] .................................................. B60B 7/00
(52) U.S. Cl. ............................. 301/37.102; 301/37.34; 301/37.376
(58) Field of Search ....................... 301/37.371, 37.34, 301/108.1, 908.4, 37.376, 37.101, 37.102, 37.372, 37.374, 37.375, 37.42

(56) References Cited

U.S. PATENT DOCUMENTS

| | | | | |
|---|---|---|---|---|
| 2,044,654 A | * | 6/1936 | Whited | 301/35.621 |
| 2,722,822 A | * | 11/1955 | Thomas | 70/167 |
| 4,083,606 A | * | 4/1978 | Scruggs | 301/37.21 |
| 4,932,724 A | * | 6/1990 | Wright | 301/37.371 |
| 4,971,396 A | * | 11/1990 | Morris | 301/37.376 |
| 5,443,582 A | * | 8/1995 | Ching | 301/37.376 |
| 5,645,324 A | * | 7/1997 | Wright et al. | 301/37.376 |
| 5,669,672 A | * | 9/1997 | Wright et al. | 301/37.371 |
| 6,045,195 A | * | 4/2000 | Okamoto | 301/37.376 |

* cited by examiner

Primary Examiner—S. Joseph Morano
Assistant Examiner—Long Bao Nguyen
(74) Attorney, Agent, or Firm—Robert L. Marsh

(57) ABSTRACT

A retainer retains a wheel cover to the portion of the studs retaining a wheel to the hub of an axle, which extends beyond the lug nuts. The retainer has a metal retainer body with a planar upper and lower surface and a long end. Two arcuate portions are spaced along the long end and the metal body is beveled in the vicinity of the arcuate portions so that the arcuate portions will engage the threaded portions extending beyond the lug nuts for two adjacent studs.

8 Claims, 7 Drawing Sheets

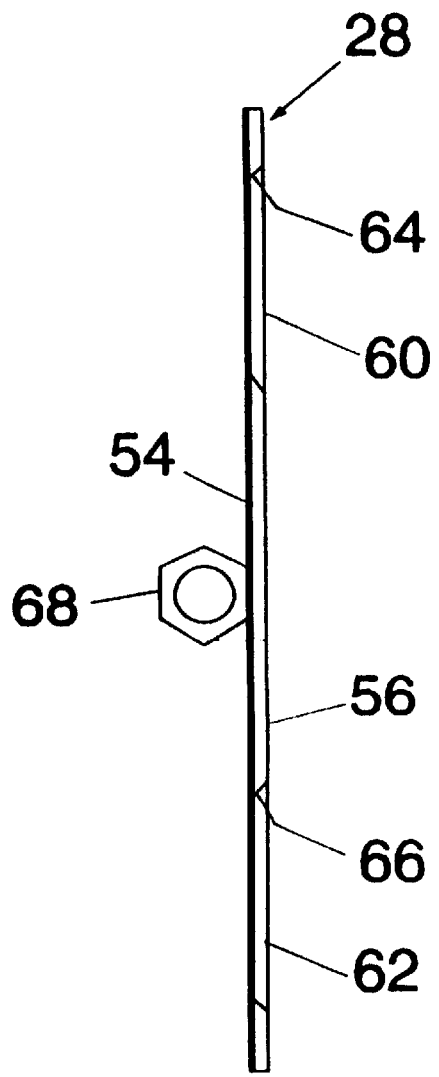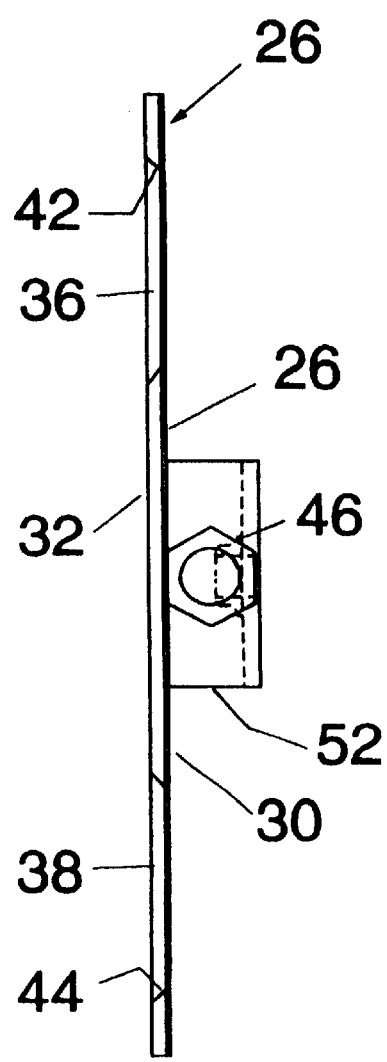

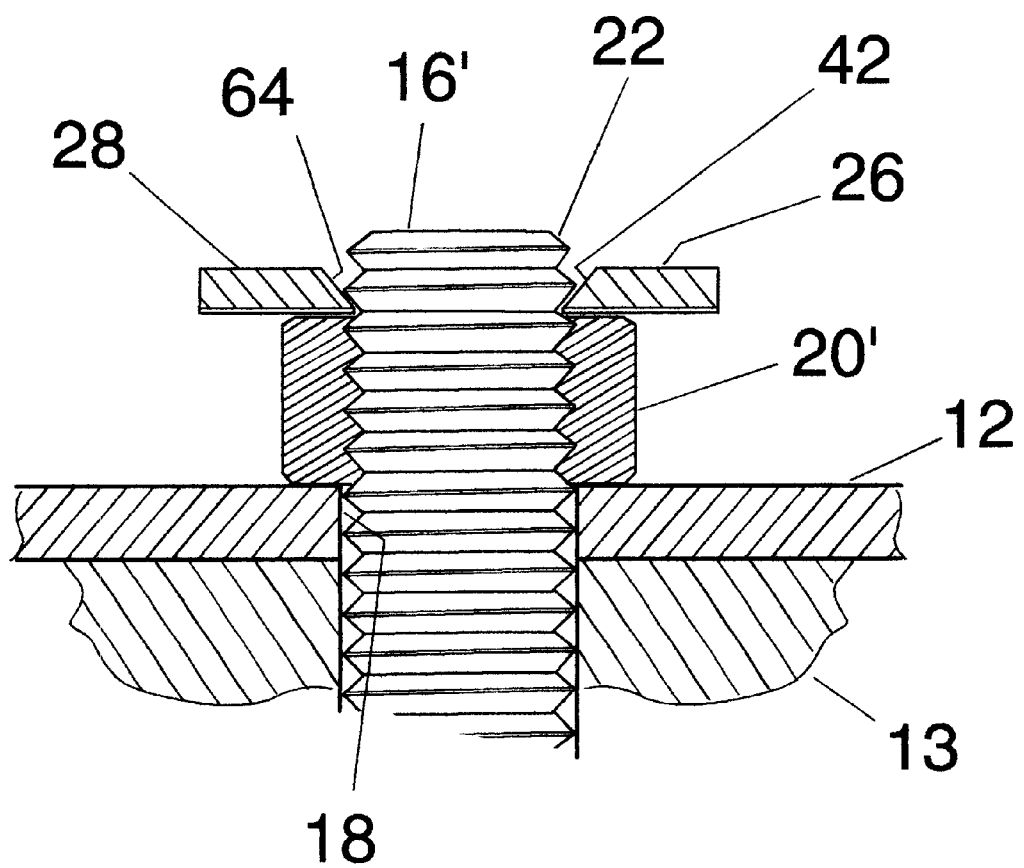

METHOD AND APPARATUS FOR ATTACHING A COVER TO A WHEEL OF A TRUCK

The present invention relates to a method of installing a decorative wheel cover to the front and rear wheels of a truck and, in particular, to a method which does not require the removal of the lug nuts retaining the wheel to the hub of the axle.

BACKGROUND OF THE INVENTION

A truck is a very functional piece of equipment and the manufacturers of trucks subordinate the physical appearance of the truck to function. Truck manufacturers, therefore, do not provide wheel covers to improve the aesthetic qualities of the wheels of the trucks they manufacture and accordingly truck wheels are not manufactured with attachment points to which a wheel cover can be retained. Wheel covers and wheel liners, which attractively cover the functional portions of a truck wheel, therefore, must attach to functional portions of the wheel. One method commonly used for attaching a wheel cover is to provide a plurality of connectors which fit under the lug nuts which retain the wheel to the axle of the truck.

Laws regulating truck traffic differ from state to state, but in many states the truck wheels must be inspected for cracks emanating from around the lug nuts. Where a wheel cover is attached using a retainer fitted under a lug nut, the lug nut cannot be removed without the use of special air operated tools. Where such retainers are used, therefore, a truck subject to inspection must be directed off road to a site where the needed equipment is available and the lug nuts retaining the connectors removed.

SUMMARY OF THE INVENTION

Briefly, the present invention is embodied in a wheel cover and a retainer for retaining the wheel cover to the wheel of a vehicle where the vehicle has a hub with a plurality of identical threaded studs equally spaced around the center of the hub. The wheel has a plurality of holes therein positioned for receiving the studs and is retained against the hub by lug nuts threaded on the portion of the studs extending through the holes in the wheel.

In accordance with the invention, at least some of the lug nuts have a portion of the threading thereon extending beyond the lug nuts. The threads which spiral around the body of the lug nut have a crest which defines a cylindrical outer surface and have a valley between the crests which define an inner surface.

To retain a cover to the distal ends of the threaded studs extending beyond the lug nuts a first and second retaining members are provided. The first retaining member has a locking side having a first arcuate portion and a second arcuate portion spaced a distance from the first arcuate portion. Each of the first and second arcuate portions define a circle having a radius that is less than the diameter of the cylinder defined by the crests of the threads and greater than the diameter of the cylinder defined by the valleys of the threads of the studs. The centers of the circles defined by the first and second arcuate portions are spaced a distance from each other equal to the distance between the centers of adjacent studs.

The first retainer member is preferably made of metal and has upper and lower planar surfaces defining a thickness. In the proximity of the first arcuate portion and the second arcuate portion the thickness of the metal is beveled with the ends having a thickness that is less than the distance between the crests of the threads of the studs such that the first and second arcuate portions will engage the portion of the threads extending beyond the lug nuts of a first and a second adjacent studs.

The second retainer member is also made of metal with upper and lower surfaces and has a locking side positioned against the locking side of the first retainer member. The locking side of the second retainer member also has third and fourth arcuate portions, the inner edges of which define circles identical to the circles defined by the inner edges of the first and second arcuate portions of the first retainer member. The arcuate portions of the second retainer member also have bevels which reduce the thicknesses therefore in the proximity of the arcuate portions. The thickness of the beveled arcuate portions is less than the distance between adjacent crests of the threads such that the third and fourth arcuate portions of the second retainer member are complementary in shape to the first and second arcuate portions of the first retainer member and will engage between the threads of two adjacent studs engaged by the first retainer member.

The first and second retainer members are adjustably held together with the arcuate portions thereof fitted around the threaded distal ends of studs by any suitable means, such as a threaded bolt. The first retainer member further has a threaded hole therein for receiving a bolt extending through the cover for thereby connecting the cover to the first retainer method.

BRIEF DESCRIPTION OF THE DRAWINGS

A better and more complete understanding of the present invention will be had after a reading of the following detailed description taken in conjunction with the drawings where:

FIG. 5 is a side elevational view of the first connector member depicted in FIG. 3;

FIG. 6 is a side elevational view of the second connector member depicted in FIG. 3;

FIG. 7 is a fragmentary enlarged partially cross sectional view of the first and second connector members assembled around the distal end of a threaded stud;

DETAILED DESCRIPTION OF THE PREFERRED EMBODIMENT

Figure 1:
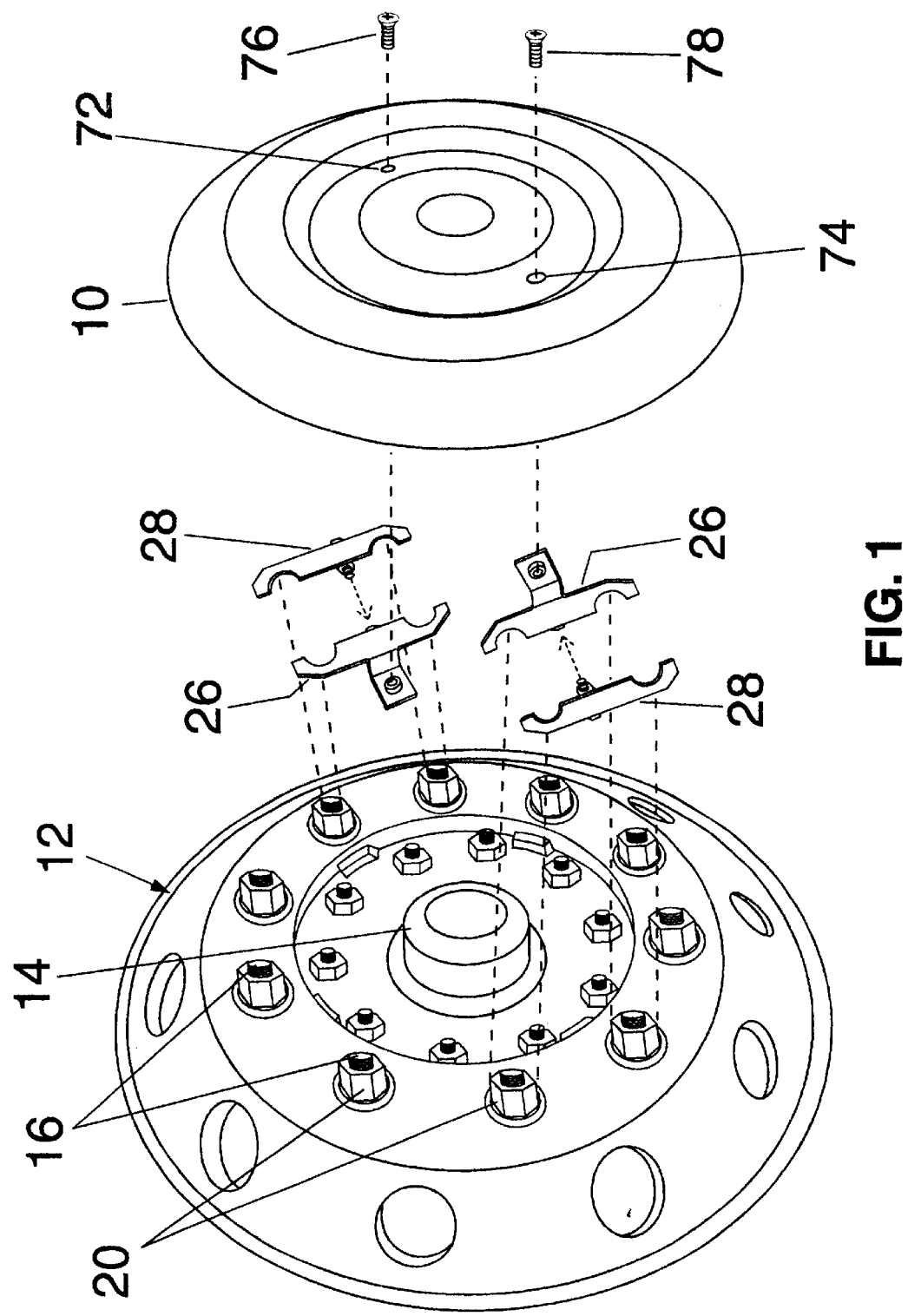
FIG. 1 is an exploded isometric view of a truck wheel with the parts for assembling the cover to the wheel in accordance with the present invention.
Figure 2:
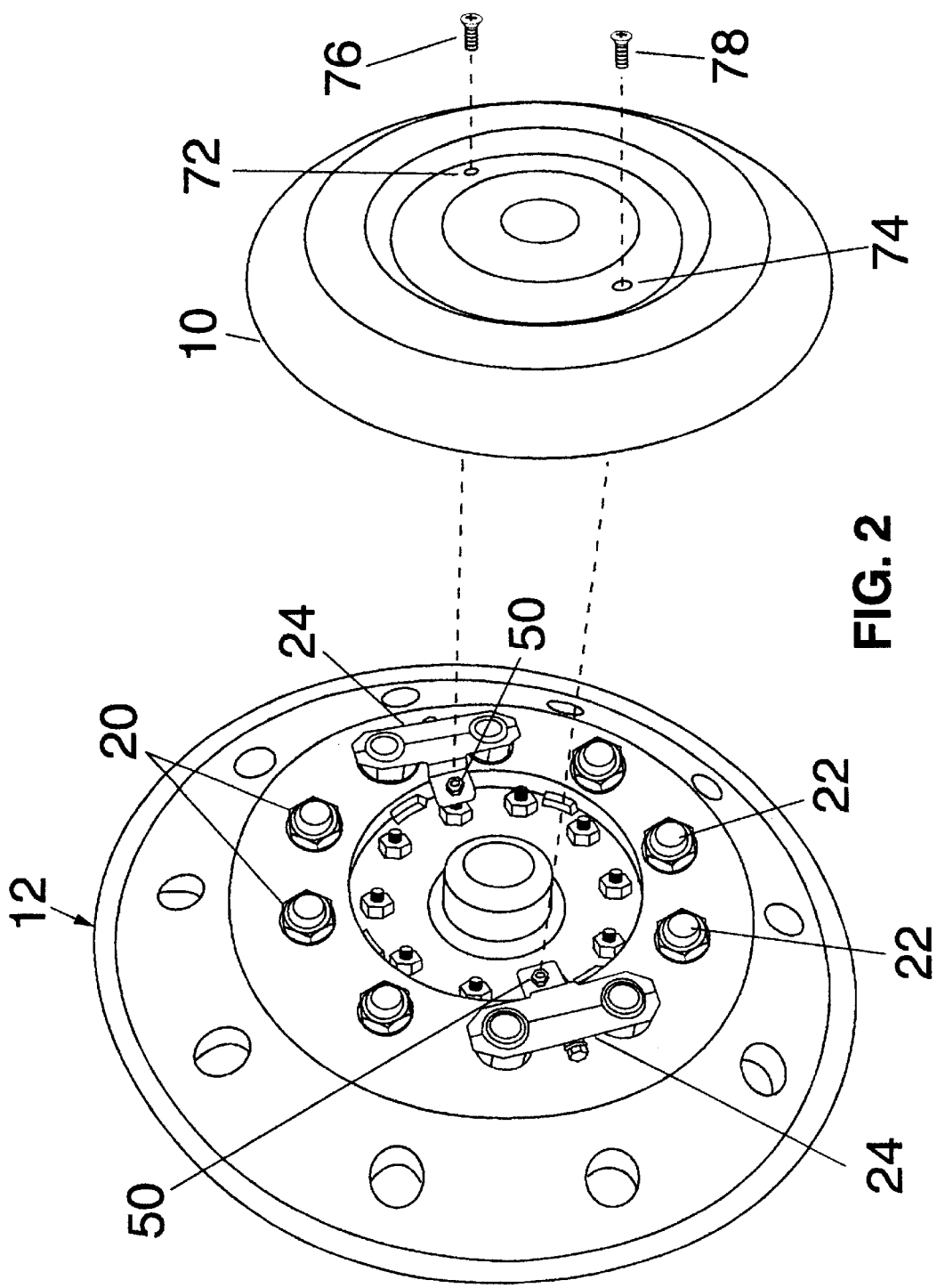
FIG. 2 is a second isometric view of a wheel with the attachment of the present invention attached thereto prior to assembly of the cover.

Referring to FIGS. 1, 2 and 7, the present invention is an attachment for attaching a wheel cover 10 across the outer surface of a truck wheel 12. The truck wheel 12 is mounted on a hub, the central portion 14 of which extends through a central opening in the wheel 10 and the hub has a plurality of parallel extending equally spaced threaded studs 16—16 surrounding the central portion 14 thereof. The wheel 10 has a central opening, not identified, through which the central portions 14 of the hub extend and a plurality of spaced holes, one of which 18 is shown in FIG. 7, for receiving the studs 16—16. Threaded on each of the studs 16—16 is a lug nut 20—20.

As best shown in FIG. 7, the length of the studs 16—16 is such that a threaded portion 22 thereof extends outward beyond the associated lug nut 20. As shown in FIGS. 2 and 7, a pair of spaced connectors 24 in accordance with the present invention are provided to retain the cover 10 to the treaded portion 22 of the studs 16,' 16".

Figure 3:
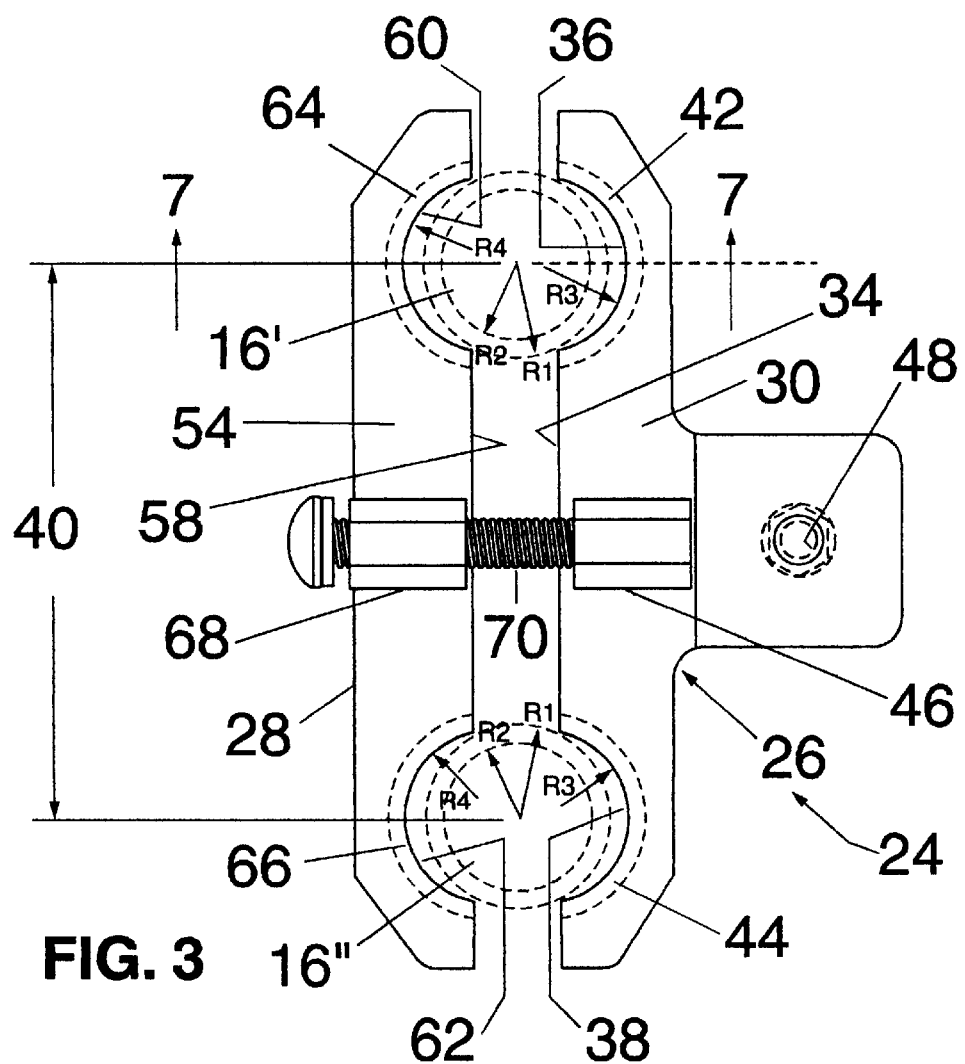
FIG. 3 is a plan view of the connector of the present invention, including the first and second connector members ready for assembly to two adjacent studs of a wheel.

Referring to FIGS. 3 through 7, each connector 24 has a first general planar connector member 26 and second complementary generally planar connector member 28 which are retained in assembled relationship around a pair adjacent studs 16', 16". The first connector member 26 is preferably made of steel plate having first and second opposing planar surfaces 30, 32 and an elongate side 34. Positioned at opposite ends of the elongate side 34 are first and second arcuate portions 36, 38. As best shown in FIG. 3 and 7, the arcuate portions 36, 38 are segments of a circle having radius R3 where R3 is less than the maximum diameter R1 of the studs 16 as defined by the spiral wrap of the crest of the threads thereon, and greater than the minimum diameter R2 of the studs 20 as defined by the spiral wrap of the valley between adjacent wraps of the threads. The centers defined by the arcuate portions 36, 38 are spaced a distance 40 which is equal to the distance between adjacent studs 16—16 of the hub. The metal in the immediate proximity of the arcuate portions 36, 38 is beveled at 42, 44 as best shown in FIG. 7 such that the edge of the arcuate portions 36, 38 fit between adjacent wraps of the crest of threads of the studs of which only stud 16' is visible.

Figure 4:
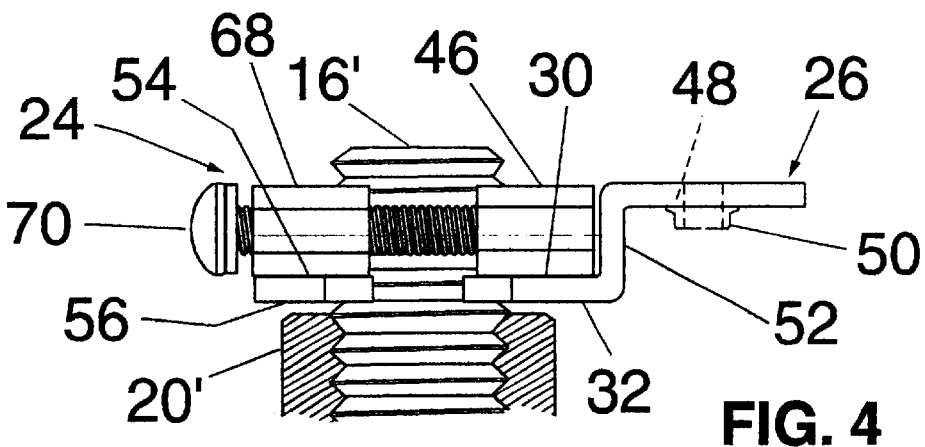
FIG. 4 is an end view elevational of the first and second connector members assembled to each other as shown in FIG. 3.

Referring to FIGS. 3, 4, and 6, the first connector member 26 has an elongate threaded nut 46 welded to the planar surface 30 and oriented such that the axis thereof is parallel to the surface 30 and perpendicular to the elongated side 34. The first connector portion 26 also has a transverse threaded hole 48 positioned generally equal distance from the first and second arcuate portions 36, 38 and extending perpendicular to the surfaces 30, 32 thereof. To improve the quality of the threads, the threaded hole may be in the form of a nut 50 welded to the surface 30 of the first connector member 26. Depending on the configuration needed to retain the wheel cover 10 to the wheel 12, the threaded hole 48 and nut 50 may be positioned on the portion of the first connector 26 having an offset 52 as needed.

Referring to FIGS. 3, 4, and 5, the second connector 28 is also made of metal with planar surfaces 54, 56 and has an elongate side 58. The elongate side 58 has third and fourth arcuate portions 60, 62 each of which is a segment of a circle having a radius R4 equal to the radius R3 defined by arcuate portions 36, 38 of the first connector member 26. Like the first connector 26, the centers of the circles defined by the arcuate portions 60, 62 are spaced a distance equal of the distance between the center of adjacent studs 16', 16". The arcuate portions 60, 62 further have beveled portions 64, 66 similar to the bevels 42, 44 of arcuate portions 36, 38.

Welded to the surface 54 of the second connector member 28 is a tubular retainer 68 the axis of which is parallel to the surfaces 54, 56 and perpendicular to the elongate side 58.

The tubular retainer further has an inner diameter sized to slideably retain an elongate bolt 70. The shaft of the elongate bolt 70 extends through the tubular retainer 68 and is threaded into the elongated threaded nut 46 on the first connector member 26 to retain the first and second connector members 26, 28 to each other with the surface 30 of the first connector member 26 substantially parallel to the surface 54 of the second connector member 28 and the surface 32 of the first connector member substantially parallel to the surface 56 of the second connector member 28.

Referring to FIGS., 3, 4 and 7, the first and second connector members 26, 28 are fitted on opposite sides of adjacent studs 16', 16" with arcuate portions 26, 60 fitted around stud 16' and arcuate portions 28, 62 fitted around stud 16." The beveled edges of the arcuate portions 26, 28, 60, 62 thereof are wedged between adjacent wraps of the crest of the threads, as best shown in FIG. 7, and are held in place by the tightening of bolt 70 into the elongate threaded nut 46. When the first and second connector members 26, 28 are tightened together with the beveled edges of the arcuate portions 36, 38, 60, 62 wedged between adjacent wraps of the crest of the threads of studs 16' and 16" the connector 24 will be locked to the studs such that it cannot be removed therefrom without damaging the threads thereof.

Referring to FIGS. 1 and 2, a first connector 24 is attached to a first pair of studs 16—16 and second connector 24 is attached to a second pair of studs 16—16 on the opposite side of the wheel 12. The cover 10 has a pair of spaced holes 72, 74 through which are inserted Phillips screws 76, 78. The distal ends of the screws 76, 78 are threaded into the threaded hole 48 and nut 50 of the two connectors 24 to retain the cover to the wheel 12.

Figure 8:
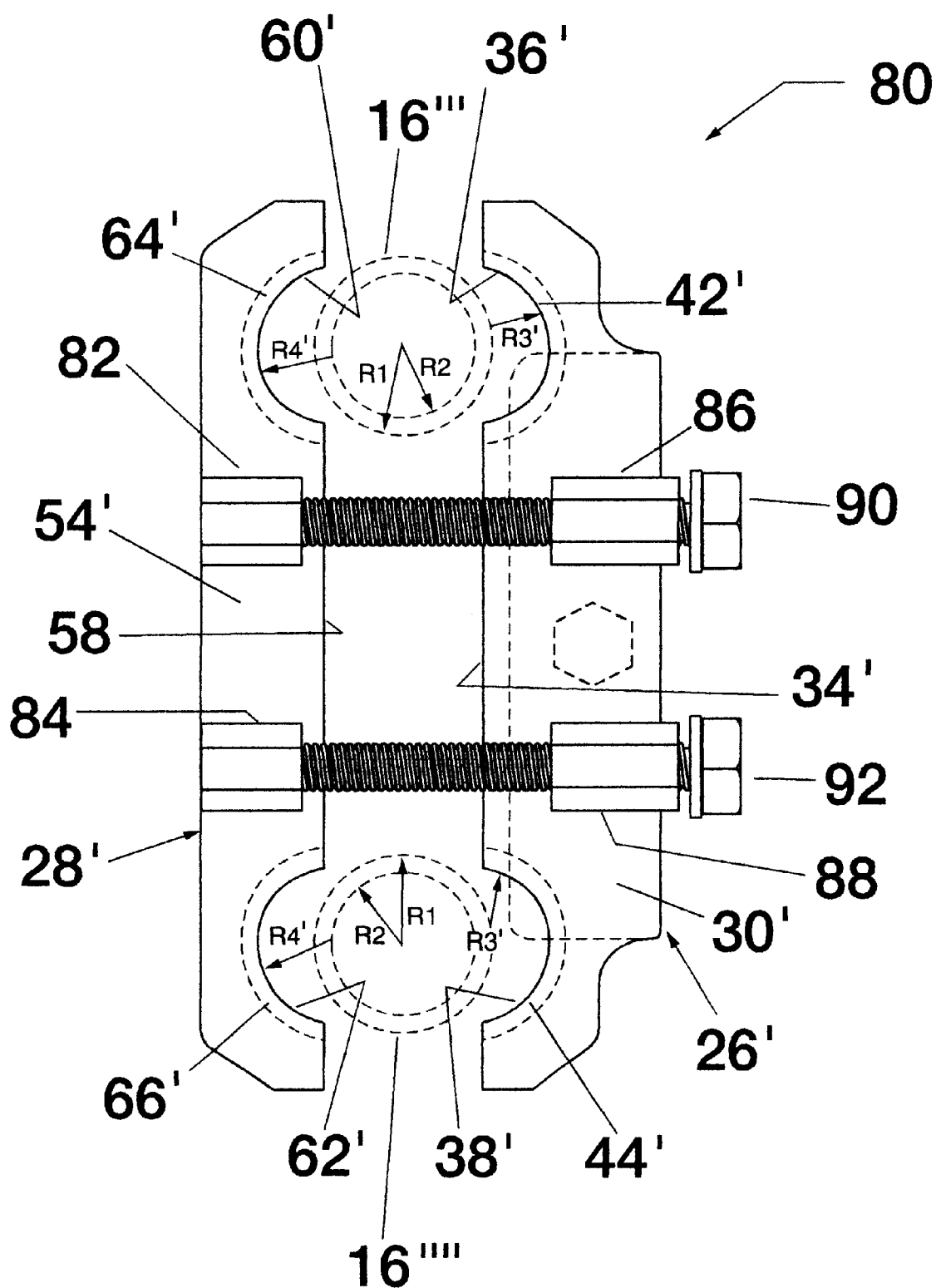
FIG. 8 is a plan view of another embodiment of the connector of the present invention, showing the first and second connector members ready for assembly to two studs of a wheel.
Figure 9:
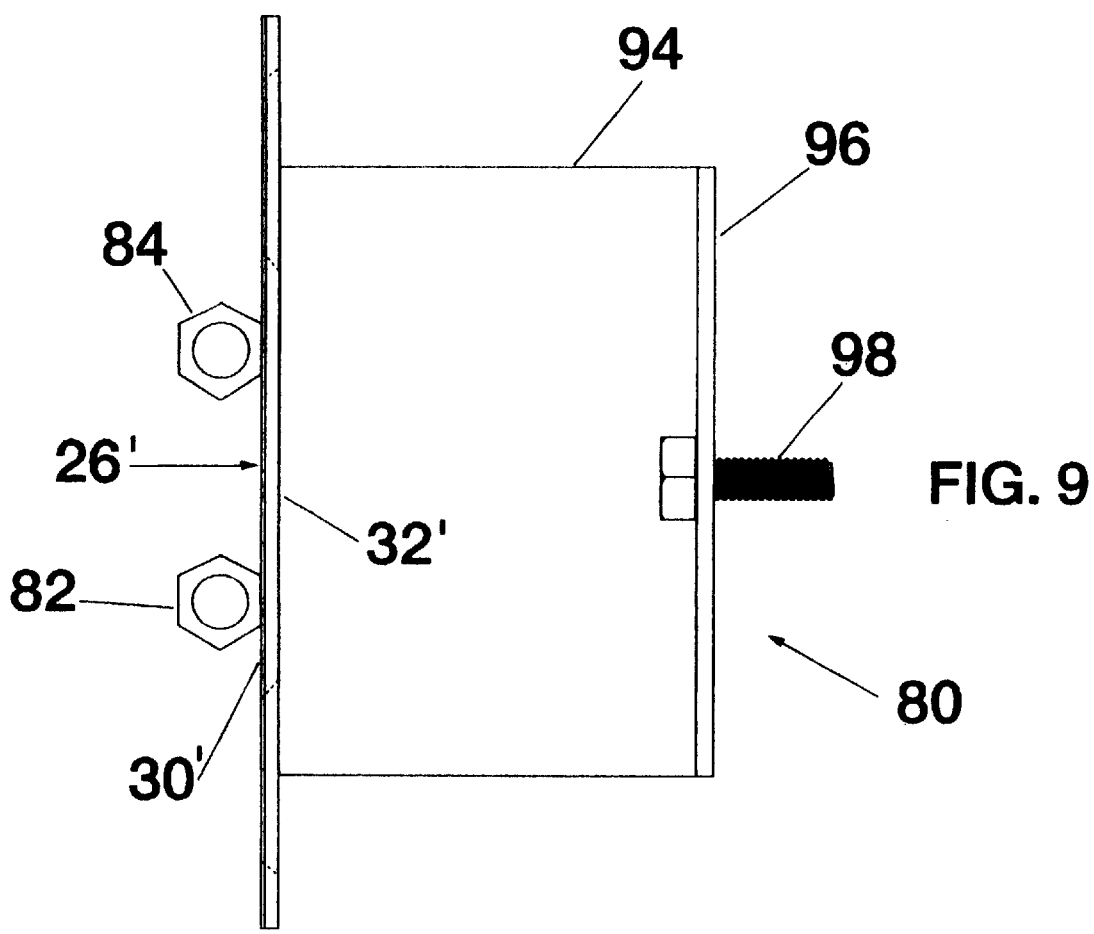
FIG. 9 is a side elevational view of the connector shown in FIG. 8 in assembled relationship without showing the studs.
Figure 10:
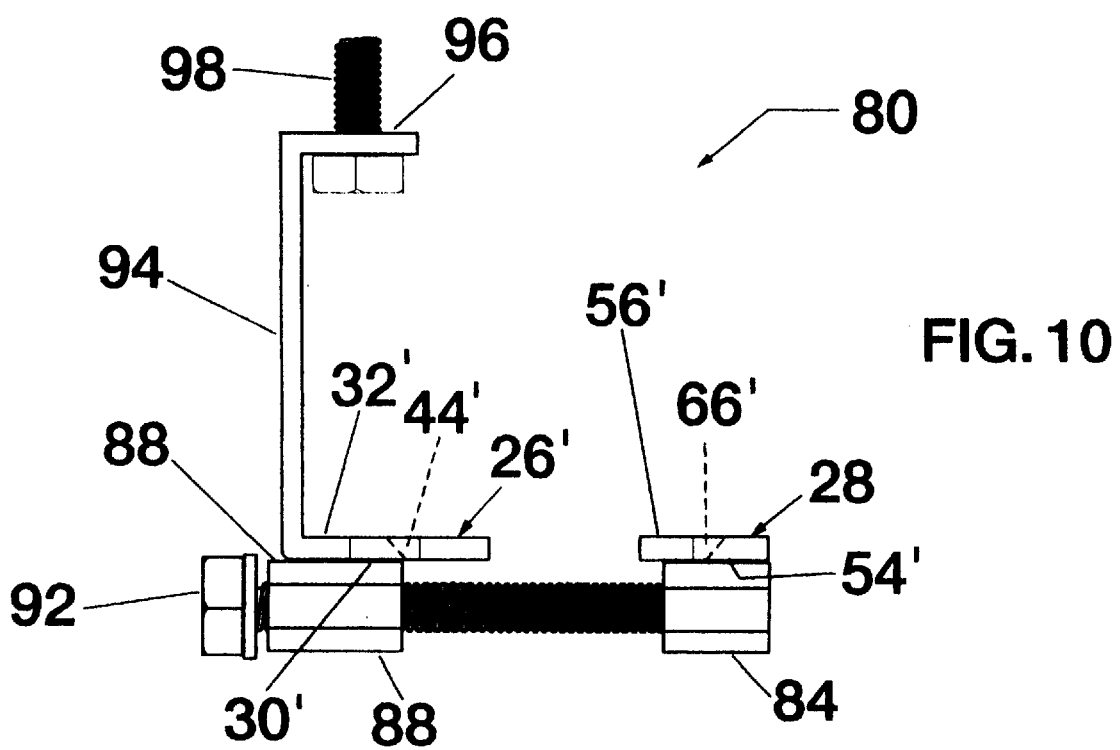
FIG. 10 is an end elevational view showing the first and second connector members as shown in FIG. 9.

Referring to FIGS. 8, 9, and 10 a second embodiment of a connector 80 is depicted in which members like those of the first embodiment 24 bear like indicia numbers except they are primed. This second embodiment 80 has first and second connector members 26,' 28' which are retained in assembled relationship around a pair of studs 16'" and 16"". The connector members 26', 28' are made of steel plate and have elongate sides 34', 58' respectively. The first connector member 26' has first and second arcuate portions 36', 38' which define circles with a radius R3' where R3' is less than R1 and greater than R2 and the second connector member 28' has arcuate portions 60', 62' which define circles with a radius R4' where R4' is again less than R1 and greater than R2.

In this embodiment, the second connector member 28' has first and second elongate threaded nuts 82, 84 welded to the surface 54' thereof with the axis of the nuts 82, 84 parallel to the planar surfaces 54', 56' of the second connector member 28' and perpendicular to the long side 58'. Similarly, the first connector member 26' has first and second spaced elongate tubular retainer sleeves 86, 88 welded to the surface 30'. The sleeves 86, 88 have an inner diameter a little larger than the diameter of bolts 90, 92 which are received within the nuts 82, 84 and the axes of the sleeves 86, 88 are perpendicular to the surfaces of the planar surfaces 30', 32' of first connector member 26' and perpendicular to the long side 34'.

The first and second sleeves 86, 88 are spaced a distance apart equal to the spacings of the threaded nuts 82, 84 and are positioned such that when bolts 90, 92 are extended through the sleeves 86, 88 and threaded into the nuts 82, 84 the arcuate portions of 36', 38' of the first connector member 26' will be opposing the arcuate portion 60', 62' of the second connector member 28'. The metal in the proximity of the arcuate portions have bevels 42', 44', 64, 66' such that the bevel portions will engage between adjacent wraps of the crest of the threads of studs and will be retained thereon when the bolts 90, 92 are tightened into their respective nuts 82, 84.

In this embodiment, the first connector member 26' includes an extension portion 94 which extends perpendicular to the planar surfaces 30', 32' thereof to an outer connector end 96, the outer connector end 96 being parallel to the surfaces 30', 32' but spaced therefrom the distance of the connector portion 94. An outwardly extending thread bolt 98 is welded to the connector end 96 with the threads of the bolt 98 oriented for passing through a complementary hole in a wheel cover, not shown, to be attached thereto with a wing nut, not shown, or the like for retaining the wheel cover to a wheel.

While the present invention has been described with respect to a single embodiment, it will be appreciated that many modifications and variations may be made without departing from the true spirit and scope of the invention. It is, therefore, the intent of the appendent claims to cover all such modifications and variations which fall within the spirit and scope of the invention.

What is claimed:

1. A cover for covering a central portion of a wheel of a vehicle, said vehicle having a hub surrounded by a plurality of parallel spaced studs, said wheel having a web with a plurality of holes therein for receiving said studs and a lug nut threaded on each of said studs to retain said wheel to said hub, wherein a portion of said threading of one of said studs extends beyond said lug nut, said threading having a spiral crest and an adjacent spiral valley, said cover comprising, an outer cover, a retainer body, means on said retainer body for wedging in said valley between two adjacent wraps of said crest of said threading of one of said studs for retaining said retainer body to said stud, and means for retaining said outer cover to said retainer body.

2. A retainer for attaching a wheel cover to a wheel of a vehicle, said vehicle having a hub with a plurality of parallel studs, each of said studs having threads and having a center, a fixed spacing between said centers of adjacent ones of said studs, the crest of the threads on said studs defining a cylindrical surface with a first radius R1, the valley between crests of said threads defining a second cylindrical surface having a radius of R2, said wheel having a web with a plurality of holes for receiving said studs and a lug nut threaded on each of said studs for retaining said wheel to said hub, wherein a portion of said threading on two of said studs extend beyond said lug nut, said retainer comprising a first retainer member and a second retainer member, said first retainer member having a side having a first arcuate portion and second arcuate portion, said first and second arcuate portions having a thickness less than the distance between adjacent wraps of said crest of said threads of said studs, said first arcuate portion spaced from said second arcuate portion a distance wherein said first arcuate portion is engageable between adjacent wraps of said crest of said threading of a first stud while said second arcuate portion is engageable between adjacent wraps of said crest of said threading of a second stud, and said second retainer member having a means for retaining said first and second arcuate portions in engagement between adjacent wraps of said crest of said threadings of said first and second studs.

3. A retainer in accordance with claim 2 wherein said first and second arcuate portions define circles having a radius R3 which is less than R1 and greater than R2.

4. A retainer in accordance with claim 2 wherein said second retainer member has a side having a third arcuate portion and a fourth arcuate portion, said third and fourth arcuate portions having a thickness less than the distance between adjacent wraps of said crest of said threads of said studs wherein said third and fourth arcuate portions are complementary to said first and second arcuate portions and are engageable adjacent wraps of said threading of said first and second studs.

5. A retainer in accordance with claim 4 wherein said third and fourth arcuate portions define circles having a radius R4 which is less than R1 and greater than R2.

6. A retainer for attaching a wheel cover to a wheel in accordance with claim 2 wherein said first and second arcuate portions are beveled with the beveled edges thereof having thicknesses less than the space between adjacent wraps of said crest of threads of said studs.

7. A retainer for attaching a wheel cover to a wheel in accordance with claim 2 where said first retainer member is connected to said second retainer member by a threaded bolt.

8. A retainer for retaining a covering over a central portion of a wheel of a vehicle, said vehicle having a hub surrounded by a plurality of parallel spaced studs, said studs having threading, said wheel having a web with a plurality of holes therein for receiving said studs and a lug nut threaded on each of said studs to retain said wheel to said hub, wherein a portion of said threading of one of said studs extends beyond said lug nut, said threading having a spiral crest and an adjacent spiral valley, said retainer having the improvement comprising means for wedging in said valley between two adjacent wraps of said crest of said threading of one of said studs for retaining said covering to said vehicle.

* * * * *